(12) United States Patent
Rico Alvarino et al.

(10) Patent No.: US 10,721,726 B2
(45) Date of Patent: Jul. 21, 2020

(54) POWER CONTROL AND TRIGGERING OF SOUNDING REFERENCE SIGNAL ON MULTIPLE COMPONENT CARRIERS

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/439,594

(22) Filed: Jun. 12, 2019

(65) Prior Publication Data

US 2019/0297611 A1    Sep. 26, 2019

Related U.S. Application Data

(63) Continuation of application No. 15/673,085, filed on Aug. 9, 2017, now Pat. No. 10,362,571.
(Continued)

(51) Int. Cl.
*H04W 4/00* (2018.01)
*H04W 72/04* (2009.01)
(Continued)

(52) U.S. Cl.
CPC ......... *H04W 72/042* (2013.01); *H04L 5/0003* (2013.01); *H04L 5/005* (2013.01);
(Continued)

(58) Field of Classification Search
CPC ..... H04L 5/0073; H04L 5/0048; H04L 5/001; H04L 5/0057; H04L 5/0023;
(Continued)

(56) References Cited

U.S. PATENT DOCUMENTS 8,526,388 B1 * 9/2013 Kaukovuori ........ H04W 72/082
                                                              370/329
9,270,434 B2 * 2/2016 Yang ....................... H04L 5/001
(Continued)

FOREIGN PATENT DOCUMENTS

CN      102638325 A  *  8/2012
CN      103457690 A  *  12/2013  ........... H04L 5/0048
(Continued)

OTHER PUBLICATIONS

International Search Report and Written Opinion—PCT/US2017/059575—ISA/EPO—dated Feb. 7, 2018.
(Continued)

*Primary Examiner* — Mahendra R Patel
(74) *Attorney, Agent, or Firm* — Loza & Loza LLP

(57) ABSTRACT

Various devices, methods, and processes are provided for handling conflicting and/or redundant power control and triggering information for transmitting reference signal(s) such as sounding reference signal (SRS) using carrier aggregation (CA). A user equipment (UE) receives a first downlink control information (DCI) and a second DCI including SRS control information that is in conflict with that of the first DCI, for controlling SRS transmission on a component carrier (CC). The UE determines a resolution to reconcile the conflict between the DCIs. Then the UE can transmit an SRS on the CC in accordance with the resolution.

20 Claims, 16 Drawing Sheets

Related U.S. Application Data

(60) Provisional application No. 62/417,997, filed on Nov. 4, 2016.

(51) Int. Cl.
    *H04L 5/00*           (2006.01)
    *H04W 52/02*        (2009.01)
    *H04W 72/12*        (2009.01)

(52) U.S. Cl.
CPC .......... *H04L 5/0053* (2013.01); *H04L 5/0094* (2013.01); *H04W 52/0206* (2013.01); *H04W 52/0216* (2013.01); *H04W 72/1289* (2013.01); *H04L 5/001* (2013.01); *H04L 5/0023* (2013.01); *H04L 5/0057* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/22* (2018.01); *Y02D 70/26* (2018.01)

(58) Field of Classification Search
CPC ..... H04L 5/0053; H04L 5/005; H04L 5/0003; H04L 5/0094; H04W 72/04; H04W 72/042; H04W 4/00; H04W 72/12; H04W 52/0216; H04W 72/0413; H04W 72/0446; H04W 52/0206; H04W 72/1289
USPC .......................... 370/329, 280, 252; 455/450
See application file for complete search history.

(56) References Cited

U.S. PATENT DOCUMENTS

| | | | | |
|---|---|---|---|---|
| 2009/0109908 | A1* | 4/2009 | Bertrand | H04L 5/0051 370/329 |
| 2010/0135273 | A1* | 6/2010 | Kim | H04B 1/69 370/344 |
| 2010/0226326 | A1* | 9/2010 | Ahn | H04W 72/1278 370/329 |
| 2011/0249639 | A1* | 10/2011 | Jen | H04B 7/0404 370/329 |
| 2011/0268028 | A1* | 11/2011 | Stern-Berkowitz | H04L 27/2613 370/328 |
| 2011/0268087 | A1* | 11/2011 | Kwon | H04L 5/0005 370/331 |
| 2012/0039273 | A1* | 2/2012 | Nam | H04L 5/0005 370/329 |
| 2012/0044906 | A1* | 2/2012 | Chen | H04L 5/001 370/329 |
| 2012/0127931 | A1 | 5/2012 | Gaal et al. | |
| 2012/0127950 | A1* | 5/2012 | Chung | H04L 5/0055 370/329 |
| 2013/0010659 | A1* | 1/2013 | Chen | H04L 5/001 370/280 |
| 2013/0051339 | A1* | 2/2013 | Yang | H04L 5/001 370/329 |
| 2013/0114562 | A1 | 5/2013 | Seo et al. | |
| 2013/0182674 | A1* | 7/2013 | Lunttila | H04L 27/261 370/329 |
| 2013/0286904 | A1 | 10/2013 | Xu et al. | |
| 2014/0036749 | A1* | 2/2014 | Wang | H04W 28/12 370/311 |
| 2014/0071902 | A1 | 3/2014 | Sorrentino et al. | |
| 2014/0071903 | A1* | 3/2014 | Sorrentino | H04W 52/325 370/329 |
| 2015/0223213 | A1* | 8/2015 | Moon | H04L 5/0048 370/329 |
| 2015/0282102 | A1* | 10/2015 | Kakishima | H04W 52/40 370/329 |
| 2016/0036578 | A1* | 2/2016 | Malladi | H04L 5/0057 370/329 |
| 2016/0100413 | A1* | 4/2016 | Hwang | H04B 7/0452 370/330 |
| 2016/0119915 | A1 | 4/2016 | Simonsson et al. | |
| 2016/0143014 | A1* | 5/2016 | Mukherjee | H04W 74/0816 370/330 |
| 2016/0219583 | A1* | 7/2016 | Blankenship | H04W 72/1205 |
| 2016/0294531 | A1 | 10/2016 | Loehr et al. | |
| 2016/0323828 | A1 | 11/2016 | Takeda et al. | |
| 2018/0132210 | A1 | 5/2018 | Rico et al. | |

FOREIGN PATENT DOCUMENTS

| | | | | |
|---|---|---|---|---|
| CN | 103457690 A | | 12/2013 | |
| EP | 2485555 A1 | * | 8/2012 | ......... H04L 27/0006 |
| EP | 2485555 A1 | | 8/2012 | |
| WO | WO-2014035180 A1 | * | 3/2014 | ......... H04L 5/0048 |
| WO | 2014109686 A1 | | 7/2014 | |
| WO | WO-2014109686 A1 | * | 7/2014 | ......... H04L 5/0073 |
| WO | 2014185841 A1 | | 11/2014 | |
| WO | WO-2014185841 A1 | * | 11/2014 | ......... H04W 72/0413 |

OTHER PUBLICATIONS

Motorola Mobility: "Remaining Details of Aperiodic SRS", 3GPP Draft, R1-110875 Aperiodic SRS, 3rd Generation Partnership Project (3GPP) Mobile Competence Centre, 650 Route Des Lucioles, F-06921, Sophia-Antipolis Cedex, France, vol. RAN WG1, Taipei, Taiwan, XP050490775, Feb. 17, 2011 (Feb. 17, 2011), pp. 1-5, Sections 1, 2.1, 2.2, 3.1, 5, 6.

* cited by examiner

POWER CONTROL AND TRIGGERING OF SOUNDING REFERENCE SIGNAL ON MULTIPLE COMPONENT CARRIERS

PRIORITY CLAIM

This application is a continuation of prior application Ser. No. 15/673,085, filed in the United States Patent and Trademark Office on Aug. 9, 2017, which claims priority to and the benefit of provisional patent application No. 62/417,997, filed in the United States Patent and Trademark Office on Nov. 4, 2016.

TECHNICAL FIELD

The technology discussed below relates generally to wireless communication systems, and more particularly, to power control of multiple component carriers and triggering of reference signals on multiple component carriers.

INTRODUCTION

In some wireless communication networks, a user equipment (UE) may be configured to combine multiple carriers to increase transmission bandwidth over that of a single carrier. One such method is called carrier aggregation (CA) in which multiple component carriers are aggregated, bundled, or combined to provide a wider transmission bandwidth that can facilitate higher peak data rate and/or overall capability. For example, in Long Term Evolution (LTE), a UE may be configured to use up to thirty-two component carriers (CCs) for CA operations. The CCs may be paired frequency division duplex (FDD) carriers, time division duplex (TDD) carriers, or a mixture of FDD and TDD carriers. One component carrier (CC) may be configured as a primary CC (e.g., carrier associated with a primary serving cell (Pcell)), and other CCs may be configured as secondary CCs (e.g., carriers associated with secondary serving cells). The UE monitors a common search space on the primary CC. In some examples, one of the secondary CCs may be configured as a primary secondary CC (e.g., carrier associated with a primary secondary cell (PScell)).

On a CC at least partially configured for uplink transmissions, the UE may transmit a reference signal, for example, a sounding reference signal (SRS) or the like in the uplink direction. The base station may use the reference signal to estimate the uplink channel quality. With respect to TDD CCs, the base station may also determine the downlink channel quality using the uplink SRS due to channel reciprocity. Additionally, when there are multiple CCs available, the UE may switch SRS transmission among the CCs.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide various devices, methods, and processes for handling conflicting and/or redundant power control and triggering information for transmitting reference signal(s) such as sounding reference signal (SRS) using carrier aggregation (CA).

One aspect of the present disclosure provides an apparatus for wireless communication. The apparatus includes a communication interface configured to utilize carrier aggregation, a memory including executable code, and a processor operatively coupled to the communication interface and the memory. The processor is configured by the executable code to receive a first downlink control information (DCI) including first sounding reference signal (SRS) control information for controlling SRS transmission on at least one component carrier (CC) of a plurality of component carriers (CCs). The processor is further configured by the executable code to determine a sequence of SRS transmissions based on the SRS control information in an order according to a component carrier order specified in the first DCI or a radio resource control (RRC) configuration. The processor is further configured by the executable code to transmit one or more respective SRSs on the at least one CC in the order according to the determined sequence of SRS transmissions.

Another aspect of the present disclosure provides a method for wireless communication using carrier aggregation. The method includes receiving a first downlink control information (DCI) including first sounding reference signal (SRS) control information for controlling SRS transmission on at least one component carrier (CC) of a plurality of component carriers (CCs). The method further includes determining a sequence of SRS transmissions based on the SRS control information in an order according to a component carrier order specified in the first DCI or a radio resource control (RRC) configuration. The method further includes transmitting one or more respective SRSs on the at least one CC in the order according to the determined sequence of SRS transmissions.

Another aspect of the present disclosure provides a computer-readable storage medium including code for causing a wireless communication device using carrier aggregation to receive a first downlink control information (DCI) comprising first sounding reference signal (SRS) control information for controlling SRS transmission on at least one component carrier (CC) of a plurality of component carriers (CCs). The code further causes the wireless communication device to determine a sequence of SRS transmissions based on the SRS control information in an order according to a component carrier order specified in the first DCI or a radio resource control (RRC) configuration. The code further causes the wireless communication device to transmit one or more respective SRSs on the at least one CC in the order according to the determined sequence of SRS transmissions.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In Long Term Evolution (LTE) Release 14, a user equipment (UE) may be configured to use up to thirty-two component carriers (CCs) to support carrier aggregation (CA). The CCs may be paired frequency division duplex (FDD) carriers, time division duplex (TDD) carriers, or a mixture of FDD and TDD carriers. A UE may be configured to transmit an uplink (UL) reference signal using any CC or multiple CCs at least partially configured for uplink transmissions. A base station may use the UL reference signal to estimate UL channel quality. An example of such an UL reference signal is the sounding reference signal (SRS). The UE's transmission of the SRS may be controlled and/or triggered by downlink control information (DCI). In next generation networks beyond LTE, a UE may be configured to support carrier aggregation (CA) using an even larger number of CCs. With this setup, in some scenarios, the UE may receive DCIs that provide redundant or conflicting information for triggering and/or controlling the power of SRS transmission using a large number of CCs.

Aspects of the present disclosure provide various devices, methods, and processes for handling conflicting and/or redundant power control and triggering information for transmitting reference signal(s) such as SRS using CA. In this disclosure, some of the examples are illustrated using DCIs as the downlink control signals. In these examples, two DCIs are considered to be in conflict when the DCIs contain different or conflicting SRS triggering information and/or power control commands, directed to the same CC to be carried out in the same slot.

Figure 1:
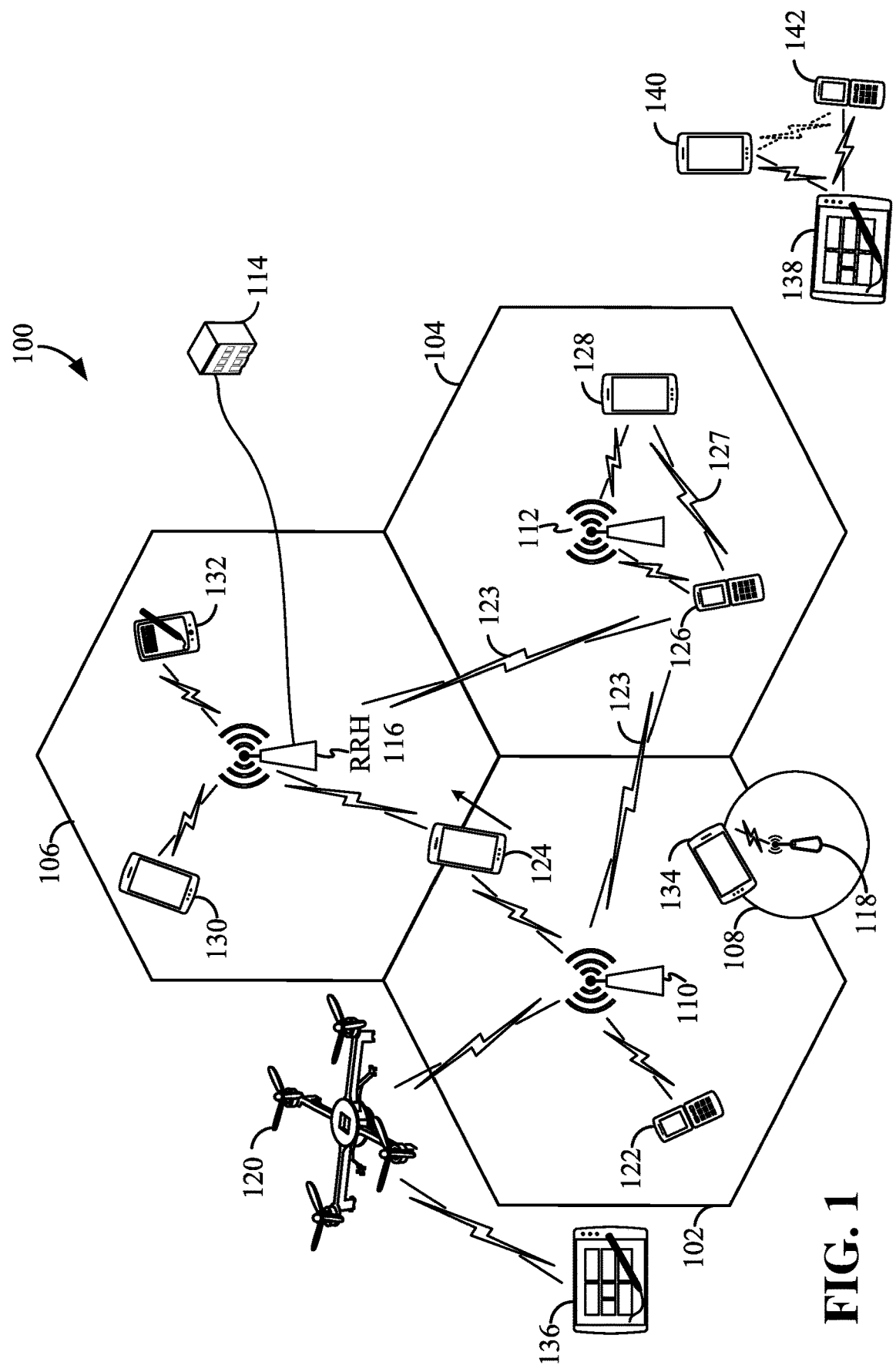
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. In some examples, a UE may aggregate multiple carriers 123 from different base stations or cells to support carrier aggregation (CC) to increase data rate and/or bandwidth.

Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at the scheduling entity 202 (see FIG. 2). Another way to describe this scheme may be to use the term broadcast channel multiplexing. In accordance with further aspects of the present disclosure, the term uplink may refer to a point-to-point transmission originating at a scheduled entity 204 (see FIG. 2).

In some examples, a mobile network node (e.g., quad-copter 120) may be configured to function as a UE. For example, the quadcopter 120 may operate within cell 102 by communicating with base station 110. In some aspects of the disclosure, two or more UEs (e.g., UEs 126 and 128) may communicate with each other using peer to peer (P2P) or sidelink signals 127 without relaying that communication through a base station (e.g., base station 112).

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of its location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality, and a security anchor function (SEAF) that performs authentication. In some examples, mobility may be handled by a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 (illustrated as a vehicle, although any suitable form of UE may be used) may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
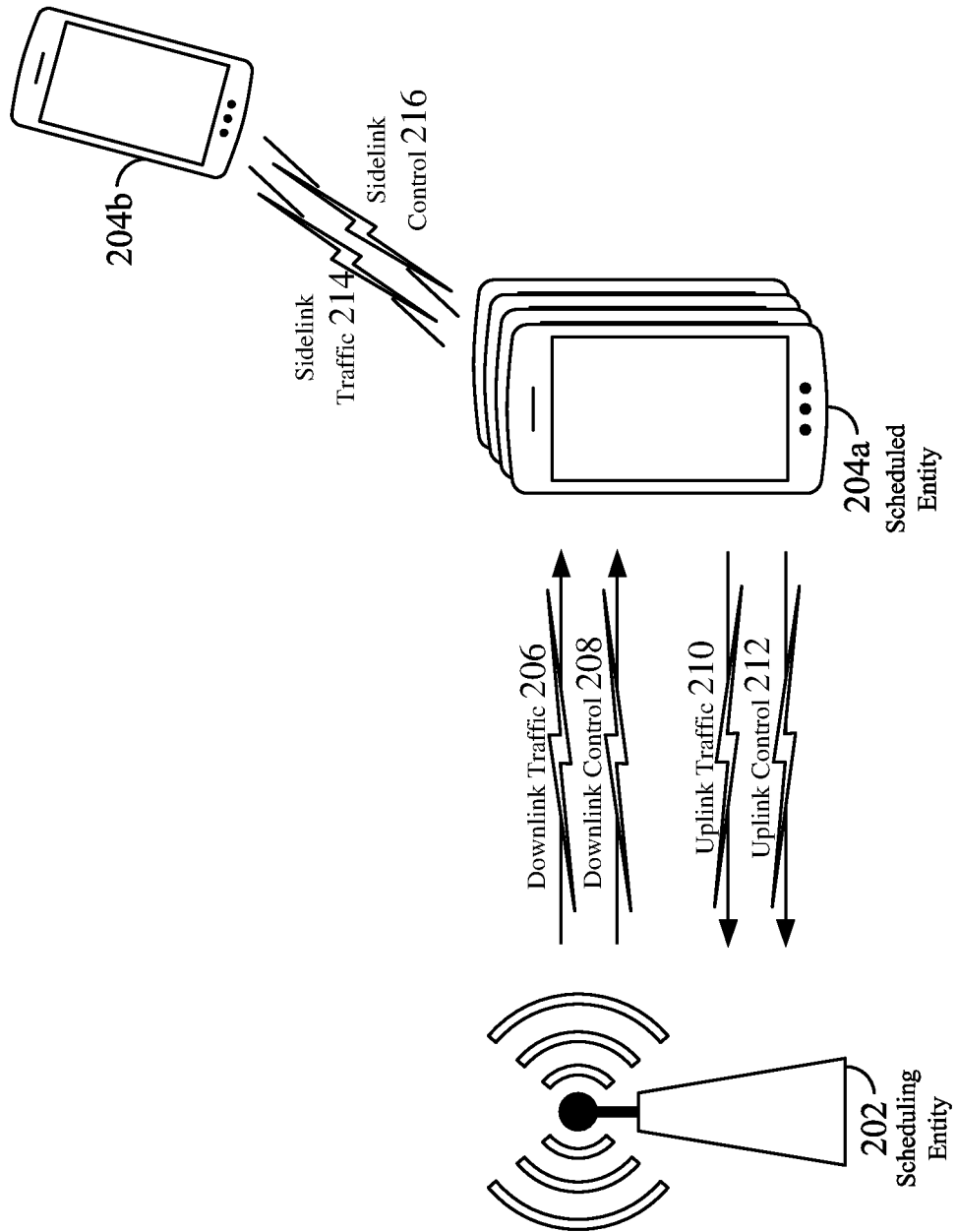
FIG. 2 is a block diagram conceptually illustrating an example of a scheduling entity communicating with one or more scheduled entities according to some aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., grants), synchronization or timing information, or other control information from another entity in the wireless communication network such as the scheduling entity 202.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-second (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The scheduled entities 204 (e.g., UEs) may be configured to transmit a reference signal, for example, SRS periodically, aperiodically, or on demand by radio resource control (RRC) signaling or semi-static scheduling. The scheduling entity 202 may use RRC signaling to transmit various control information to the scheduled entities. In one example, the scheduling entity 202 may use RRC signaling or similar semi-static signaling technique to broadcast SRS configuration to the scheduled entities 204. The SRS configuration provides the UE with time domain (slot) as well as frequency domain resources (e.g., carriers or channels) for transmitting the SRS. The scheduling entity 202 may configure the scheduled entity to transmit single SRS, aperiodic SRS, and/or periodic SRS.

The scheduled entities may be configured to transmit an aperiodic SRS on demand by RRC signaling. Once configured, the scheduling entity may trigger the transmission of the aperiodic SRS by transmitting downlink control information (DCI) to the scheduled entity, for example, in a physical downlink control channel (PDCCH) or the like. In some examples, DCI may also indicate UL resource allocation or grant (e.g., resources for SRS transmission) and descriptions about DL traffic transmitted to the scheduled entities. DCI may have different formats, and the scheduling entity may use some predetermined DCI formats to provide SRS triggers and power control parameters to the scheduled entities.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
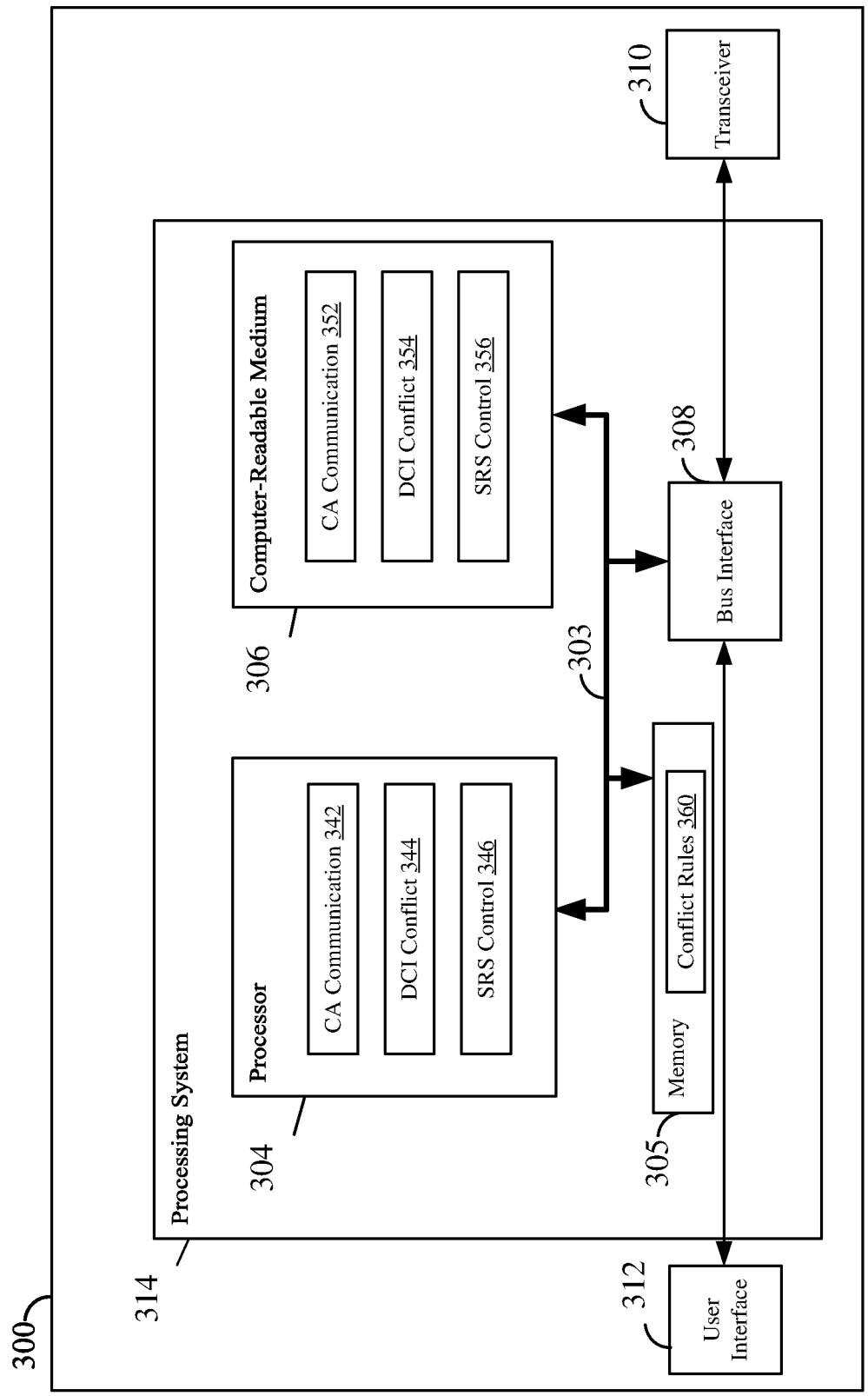
FIG. 3 is a block diagram illustrating an example of a hardware implementation for an apparatus employing a processing system.

FIG. 3 is a block diagram illustrating an example of a hardware implementation for an apparatus 300 employing a processing system 314. For example, the apparatus 300 may be a user equipment (UE) or scheduled entity as illustrated in any one or more of FIGS. 1, 2, 3, and/or 5. In another example, the apparatus 300 may be a base station or scheduling entity as illustrated in any one or more of FIGS. 1, 2, 3, and/or 5.

The apparatus 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 300 may be configured to perform any one or more of the functions described herein. That is, the processor 304, as utilized in the apparatus entity 300, may be used to implement any one or more of the processes and procedures described below and illustrated in FIGS. 5-15.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include various circuitry configured for various functions, including, for example, the functions described below in relation to FIGS. 5-15. The processor 304 may include carrier aggregation (CA) communication circuitry 342, DCI conflict resolution circuitry 344, and SRS control circuitry 346. The CA communication circuitry 342 in cooperation with CA communication software 352 may be configured to communicate with a base station or a UE using two or more component carriers via the transceiver 310. The DCI conflict resolution circuitry 344 in cooperation with DCI conflict software 354 may be configured to perform functions for resolving conflicts between DCIs received from a scheduling entity. For example, the DCIs may carry conflicting control information for SRS transmission on one or more component carriers. The DCI conflict resolution circuitry 344 may utilize certain predetermined conflict resolution rules 360 to resolve any conflict between SRS control information carried in different DCIs. The conflict resolution rules 360 may be stored in memory 305 or any storage, for example, a computer-readable medium 306. The SRS control circuitry 346 in corporation with SRS control software 356 may be configured to control SRS transmission. For example, the SRS control circuitry 346 may control the transmission and power of SRS based on the DCI(s) received from a scheduling entity. The above-described circuitry may be implemented in any combinations of software and hardware.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include software configured for various functions, including, for example, one or more of the functions described above in relation to FIGS. 5-15.

In some aspects of the disclosure, a scheduled entity (e.g., UE) may be configured for carrier aggregation (CA) operation using multiple TDD and/or FDD component carriers (CCs). In one example, the scheduled entity may be configured to use TDD CCs, which may have the same or different slot configurations. For example, these TDD CCs may have different UL and DL slot configurations. For example, in the same time slot, one TDD CC may be UL while another TDD CC may be DL, and vice-versa. In addition, special slots can be configured differently for different CCs. The special slots may be utilized for downlink-to-uplink switching or vice-versa. That is, with reference to communication by a scheduled entity 204, when utilizing a TDD carrier, where the timing for both the uplink and downlink transmissions is driven by a scheduling entity 202, there may be a need for a certain time gap when transitioning from a DL slot to an UL slot, or an UL slot to a DL slot. However, there is a certain propagation delay between the transmission of the DL slot from the scheduling entity 202 to the scheduled entity 204, as well as between the transmission of the UL slot from the scheduled entity 204 to the scheduling entity 202. To account for these propagation delays, as well as RF switching times at the respective radios, special slots insert a gap between the end of a DL transmission and the beginning of an UL transmission, so that the scheduling entity 202 and the scheduled entity 204 can maintain synchronization. Here, the gap may correspond to a time (or a guard period) when neither uplink nor downlink communications occur. The length of the gap in the special slot can be configured in accordance with the size of the cell.

Figure 4:
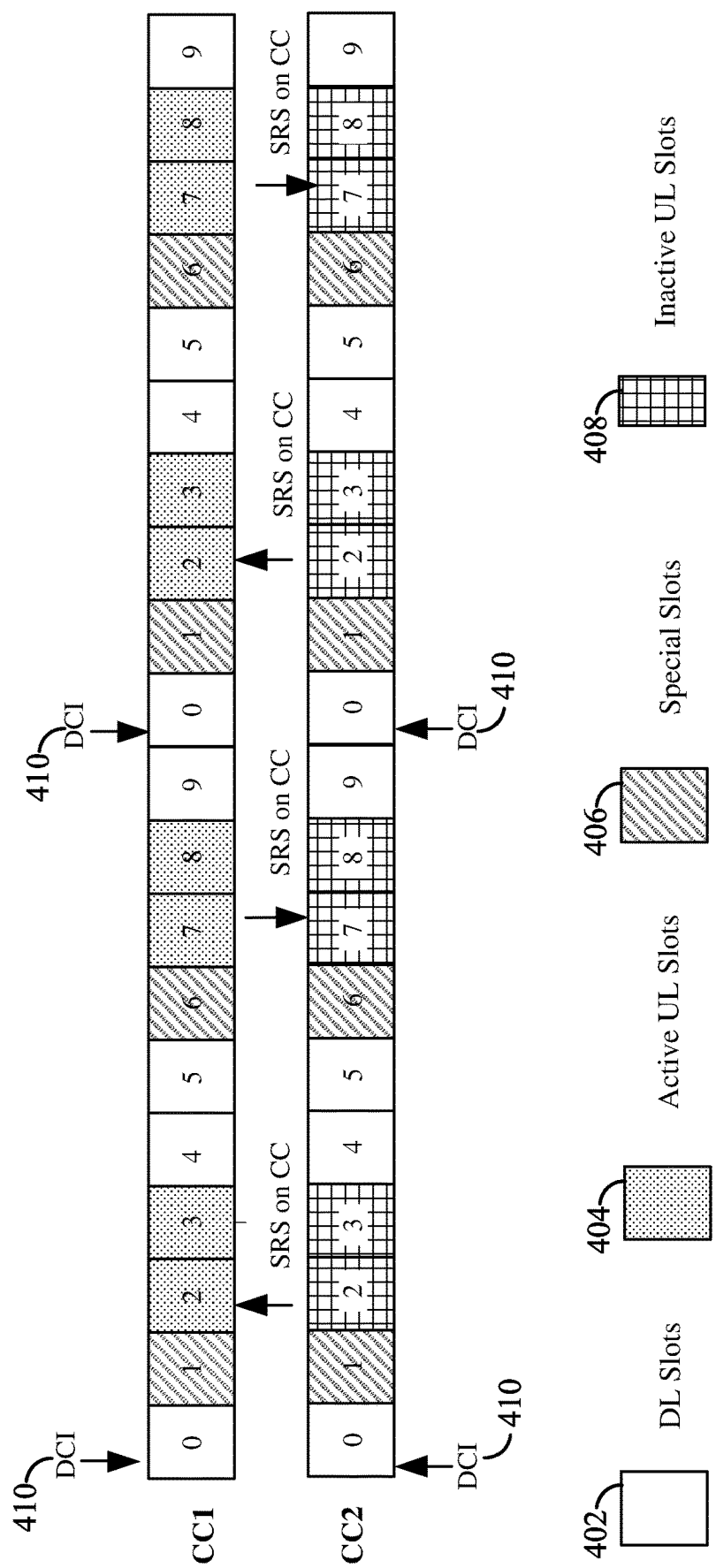
FIG. 4 is a diagram illustrating sounding reference signal (SRS) switching between time division duplex component carriers in accordance with some aspects of the disclosure.

FIG. 4 is a diagram illustrating SRS switching between TDD CCs in accordance with some aspects of the disclosure. In one example, a scheduled entity may be configured with two TDD CCs, illustrated as CC1 and CC2 in FIG. 4. However, the concept and idea may be extended to more than two CCs in other examples. In this example, CC1 may be the primary CC (PCC), and CC2 may be the secondary CC (SCC). CC1 has a number of DL slots 402 (e.g., slots 0, 4, 5, and 9), active UL slots 404 (slots 2, 3, 7, 8), and special slots 406 (e.g., slots 1 and 6). CC2 has a similar configuration, but its UL slots 408 are inactive. In some cases, the UL slots on a certain CC may be inactive due to a limitation in UE capability. For example, some UEs may not have the hardware and/or software capability to transmit simultaneously on more than one CC. In that case, the scheduled entity does not transmit in an inactive UL slot of a CC. In some aspects of the disclosure, the scheduled entity may be configured to switch SRS transmission between CC1 and CC2 to exploit channel reciprocity on both CCs. For example, the scheduled entity may switch SRS transmission between CC1 and CC2 during slots 2 and 7. Therefore, the scheduled entity may transmit SRS either using CC1 or CC2 in slots including inactive UL slots.

In some scenarios, the scheduled entity may be resource limited (e.g., single RF chain) such that when it switches SRS transmission between the CC1 with active UL slots and the CC2 with inactive UL slots, it might cause certain UL transmission delays. For example, when the scheduled entity switches between CCs, it may reconfigure its modem radio and/or transceiver circuitry, causing a gap or delay in the UL transmissions.

A scheduling entity may control or trigger SRS transmissions on different CCs using separate or UE-specific DL DCIs 410. Each DL DCI transmitted on a CC is used to trigger SRS UL transmission on the same CC. For example, a DL DCI may include an SRS request flag or field that can trigger and/or control SRS transmission. However, when the number of CCs increases, SRS signaling overhead will also increase. Therefore, in some aspects of the disclosure, a scheduling entity may transmit a group DCI to trigger SRS on multiple CCs. A group DCI may be directed to a group Radio Network Temporary Identifier (G-RNTI) or multiple G-RNTIs. A group RNTI may be used to identify a group of scheduled entities (e.g., UEs) or connections (e.g., CCs) for which the group DCI is intended. Using the group DCI, a scheduling entity may trigger SRS transmission on multiple CCs.

Figure 5:
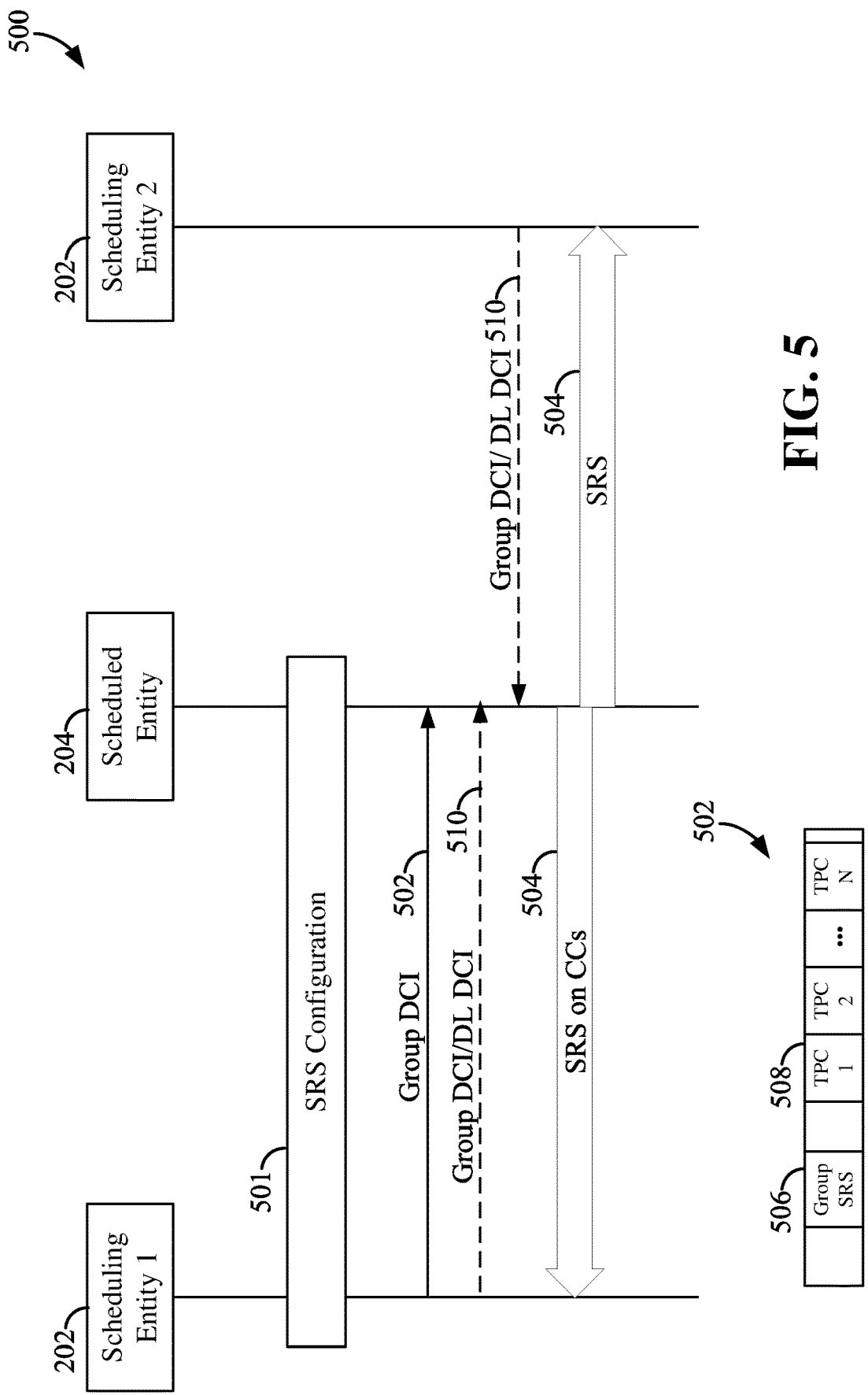
FIG. 5 is a diagram illustrating an exemplary process for configuring and triggering SRS using downlink control information (DCI) in accordance with some aspects of the disclosure.

FIG. 5 is a diagram illustrating an exemplary process 500 for configuring and triggering SRS using group DCI in accordance with some aspects of the disclosure. A scheduling entity 202 may configure a scheduled entity 204 to transmit SRS using, for example, RRC signaling or any control signaling procedure. In this example, the scheduling entity 202 may transmit an RRC configuration message 501 to configure the scheduled entity 204 to use multiple CCs to support CA. The RRC configuration 501 may include an SRS configuration that defines one or more of the CCs used for SRS transmissions.

After the SRS configuration is completed, the scheduling entity 202 may transmit SRS control information to the scheduled entity 204. The SRS control information controls SRS triggering and/or SRS transmission power. In one aspect of the disclosure, the SRS control information may be included in a DCI. For example, the scheduling entity may transmit a group DCI 502 to the scheduled entity 204 to trigger one or more of the configured SRS transmissions. The group DCI 502 may include one or more SRS request fields configured to trigger SRS transmission(s) on one or more CCs. For example, each SRS request field may have one bit that may be set to a certain value (e.g., a value of 1) to trigger SRS transmission on the corresponding CC or set to a different value (e.g., a value of 0) for no SRS transmission. In response to the group DCI 502, the scheduled entity 204 may transmit one or more SRSs 504 on the triggered CC(s).

In one aspect of the disclosure, the group DCI 502 includes a single SRS request field 506 (e.g., group SRS request field) configured to trigger SRS transmission on a group of CCs (more than one CC). In one example, the single SRS request field 506 may be transmitted to a scheduled entity that is configured with more than five CCs (or a predetermined number of CCs). For all the CCs that are triggered by this single SRS request field, each SRS transmission has a corresponding transmit power control (TPC) field 508 in the group DCI 502, and the number of bits reserved for the TPC fields may be determined by the maximum group size of the configured groups by design. In one example, the maximum number of CCs of a group may be eight or other numbers in various designs.

In one aspect of the disclosure, the group DCI 502 includes N number of separate trigger fields that are configured to trigger SRS transmission on up to N number of CCs. In one example, this type of group DCI 502 may be used for a scheduled entity that is configured with less than or equal to a predetermined number of CCs by design (e.g., 5 CCs). In this configuration, the group DCI 502 also includes a separate TPC field for each CC.

In some scenarios, a scheduled entity may receive multiple DCIs 510, instead of a single DCI 502, that may include SRS triggers and/or power control commands to be applied to the same CC in the same slot. In one example, the same CC may be triggered by different group DCIs 510 from the same scheduling entity 202 or different scheduling entities. In another example, the same CC may be triggered by a group DCI and a DL DCI from the same scheduling entity or different scheduling entities. However, the DCIs may have conflicting SRS triggers and/or power control commands to be applied to the same CC. In one example, one DCI may trigger SRS in a slot, while another DCI does not trigger SRS in the same slot for the same CC. In another example, one DCI may increase SRS transmission power in a slot, while another DCI may decrease SRS transmission power in the same slot. Therefore, a solution is needed to deal with the conflicting SRS triggers and/or power control commands from the same base station and/or different base stations.

Figure 6:
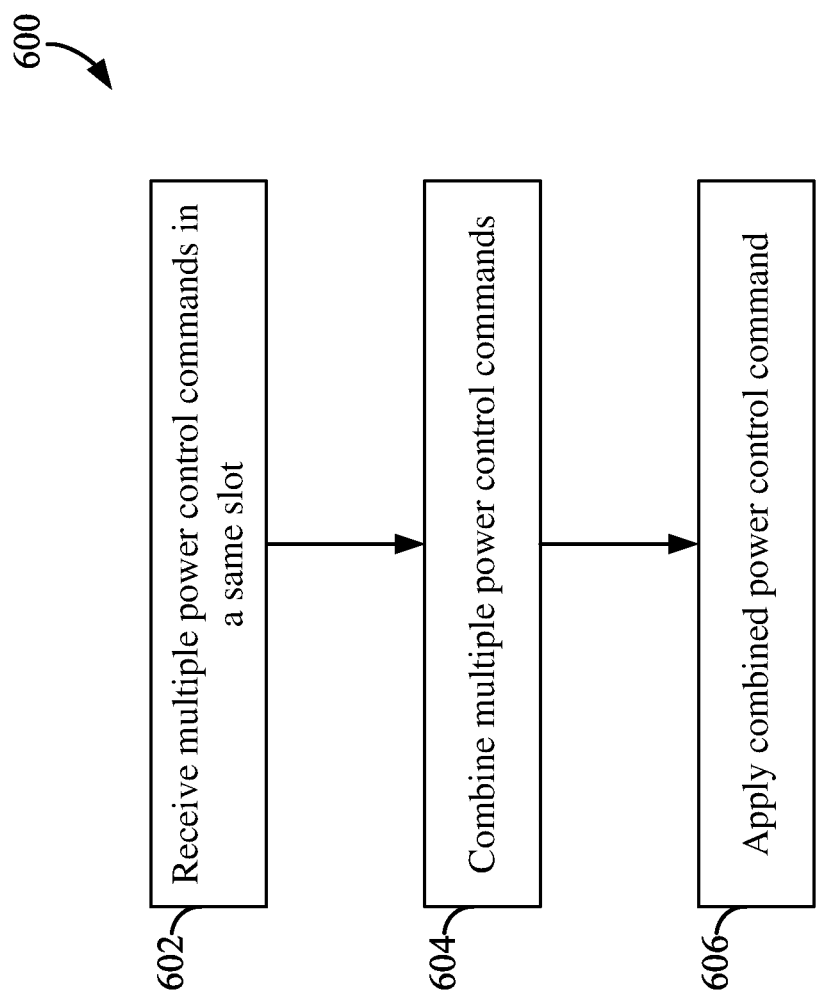
FIG. 6 is a diagram illustrating a process for handling multiple power control commands for a component carrier (CC) in a slot in accordance with an aspect of the disclosure.

FIG. 6 illustrates a process 600 for handling multiple power control commands for a same CC in the same slot according to some aspects of the disclosure. This process may be performed by the scheduled entity 204 or any wireless devices, for example, those illustrated in FIGS. 1, 2, 3, and/or 5.

At block 602, the scheduled entity may receive multiple power control commands in a same slot. For example, the scheduled entity may have received a DL/group DCI as well as a DL DCI or another group DCI, both DCIs triggering SRS transmission on the same CC in the same slot. In one example, the two DCIs may correspond to different group RNTIs that are assigned to two groups of UEs that may overlap.

The scheduled entity may have different options or methods for handling the multiple power control commands received in the same slot. In a first option, the scheduled entity may apply all received power control commands (TPCs) to the same CC. For example, at block 604, the scheduled entity may combine (e.g., add) the power control values (e.g., −1 db, 0, +1 db, +3 db) together from all received power control commands. Then, at block 606, the scheduled entity applies the combined result to the SRS transmission triggered on the same CC. For example, the scheduled entity may control the transmit power of the SRS according to the combined result of the TPCs.

Figure 7:
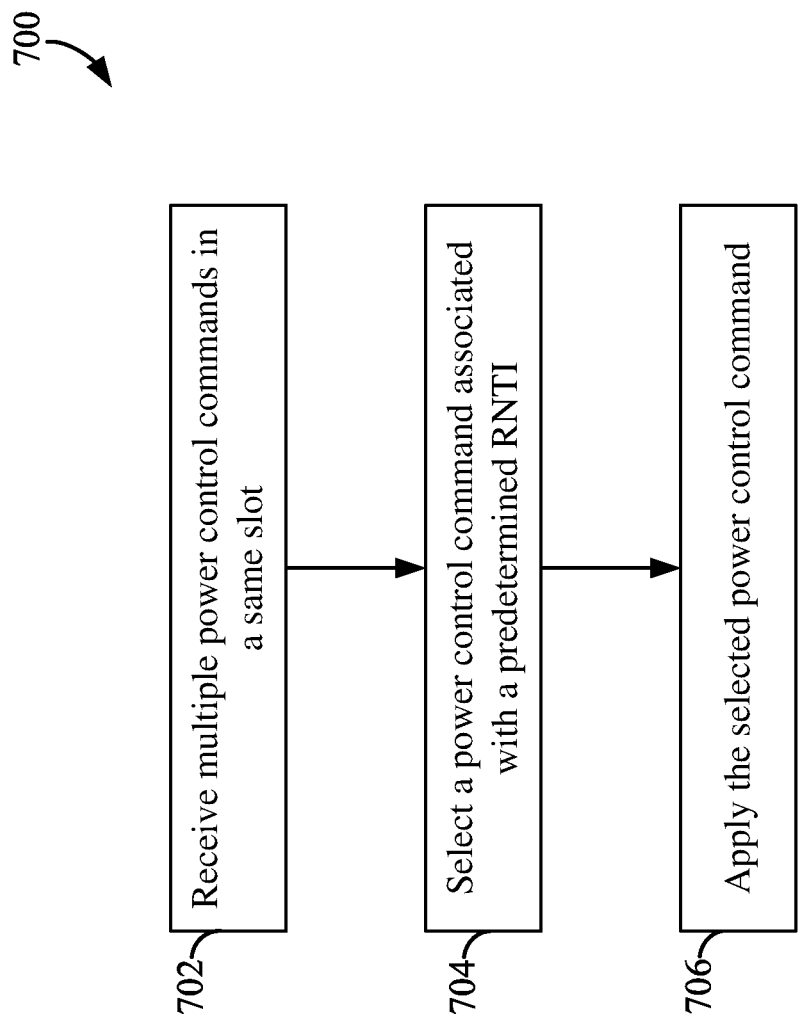
FIG. 7 is a diagram illustrating a process for handling multiple power control commands for a CC in a slot in accordance with another aspect of the disclosure.

FIG. 7 illustrates a process 700 for handling multiple power control commands for a same CC in the same slot according to some aspects of the disclosure. This process may be performed by the scheduled entity 204 or any wireless devices, for example, those illustrated in FIGS. 1, 2, 3, and/or 5. At block 702, the scheduled entity may receive multiple power control commands (e.g., DL DCIs and/or group DCIs) for the same CC in a same slot. For example, the DCIs may be for different RNTIs or groups of UEs.

In one aspect, the scheduled entity may select and apply a subset of the received power control commands. In one example, at block 704, the scheduled entity may select the power control command associated with a predetermined RNTI. An RNTI is a number used for the cyclic redundancy checking (CRC) scrambling of the DCI. In one aspect, the scheduled entity may select the power control command associated with a lower group RNTI value. By comparing two or more RNTI values of the multiple power control commands, the scheduled entity can select the power control command associated with the lower group RNTI value. In other examples, the scheduled entity may select the power control command based on other methods. At block 706, the scheduled entity applies the selected power control command to the CC.

Figure 8:
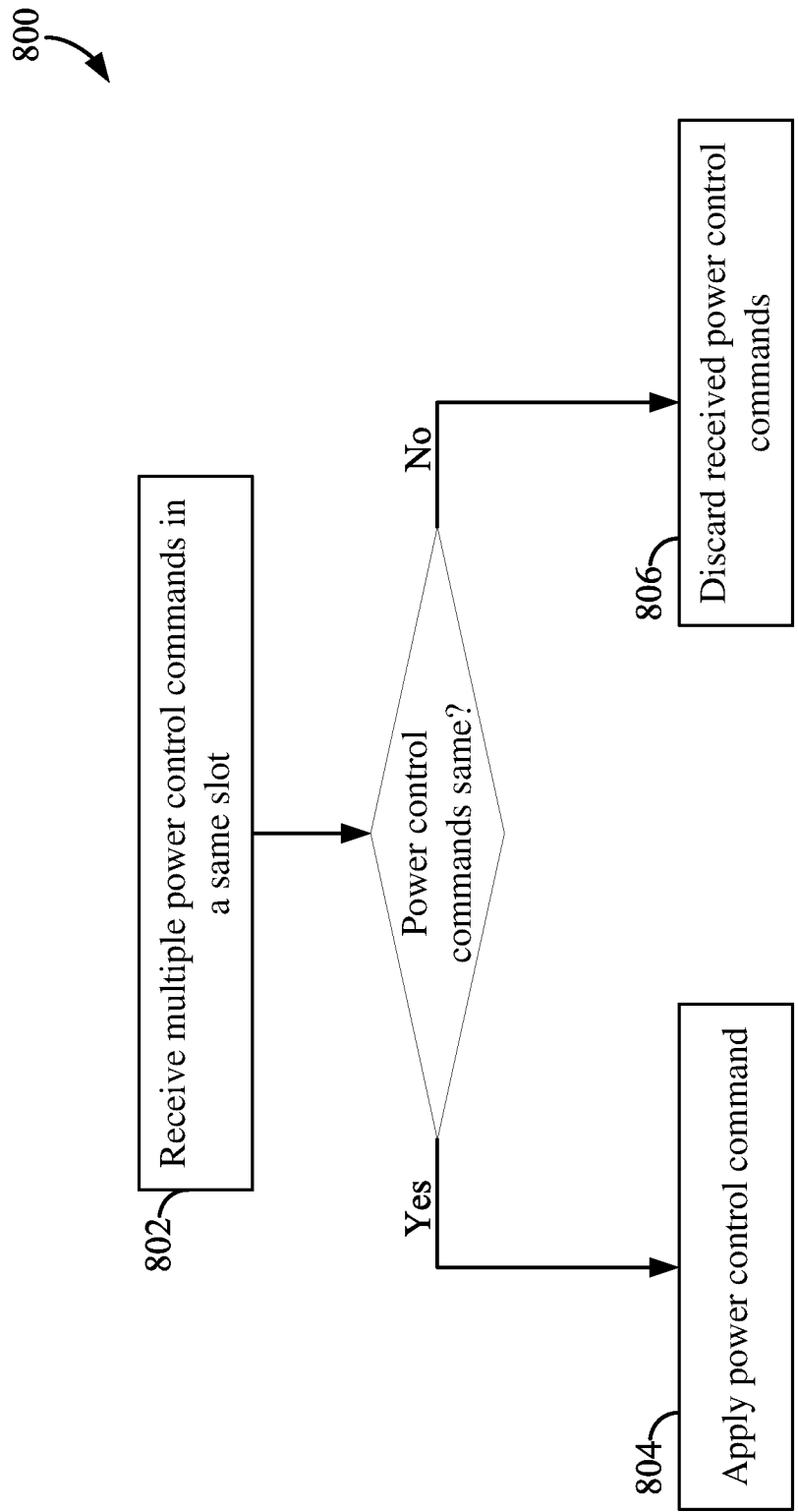
FIG. 8 is a diagram illustrating a process for handling multiple power control commands for a CC in a slot in accordance with another aspect of the disclosure.

FIG. 8 illustrates a process 800 for handling multiple power control commands for a same CC in the same slot according to some aspects of the disclosure. This process may be performed by the scheduled entity 204 or any wireless devices, for example, those illustrated in FIGS. 1, 2, 3, and/or 5.

At block 802, the scheduled entity may receive multiple power control commands (e.g., DL DCIs and/or group DCIs) for the same CC in a same slot. The scheduled entity may assume that the power control commands received from different DCIs in the same slot are supposed to be the same for the same CC. Therefore, if the power control commands are different or inconsistent, these power control commands may be invalid or have errors.

At block 804, if the scheduled entity determines that the power control commands are indeed the same, the scheduled entity applies the power control command to the CC triggered for SRS transmission. In this case, the scheduled entity may apply only one power control command because the power control commands are the same.

At block 806, if the power control commands are not the same, the scheduled entity considers that as an error and discards all power control commands. The power control commands are not the same if at least two power control commands are different. In some implementations, the UE may expect the power control commands to be the same. When the commands are not the same, the UE may implement various methods to figure out which one or more of the power control commands is invalid.

Figure 9:
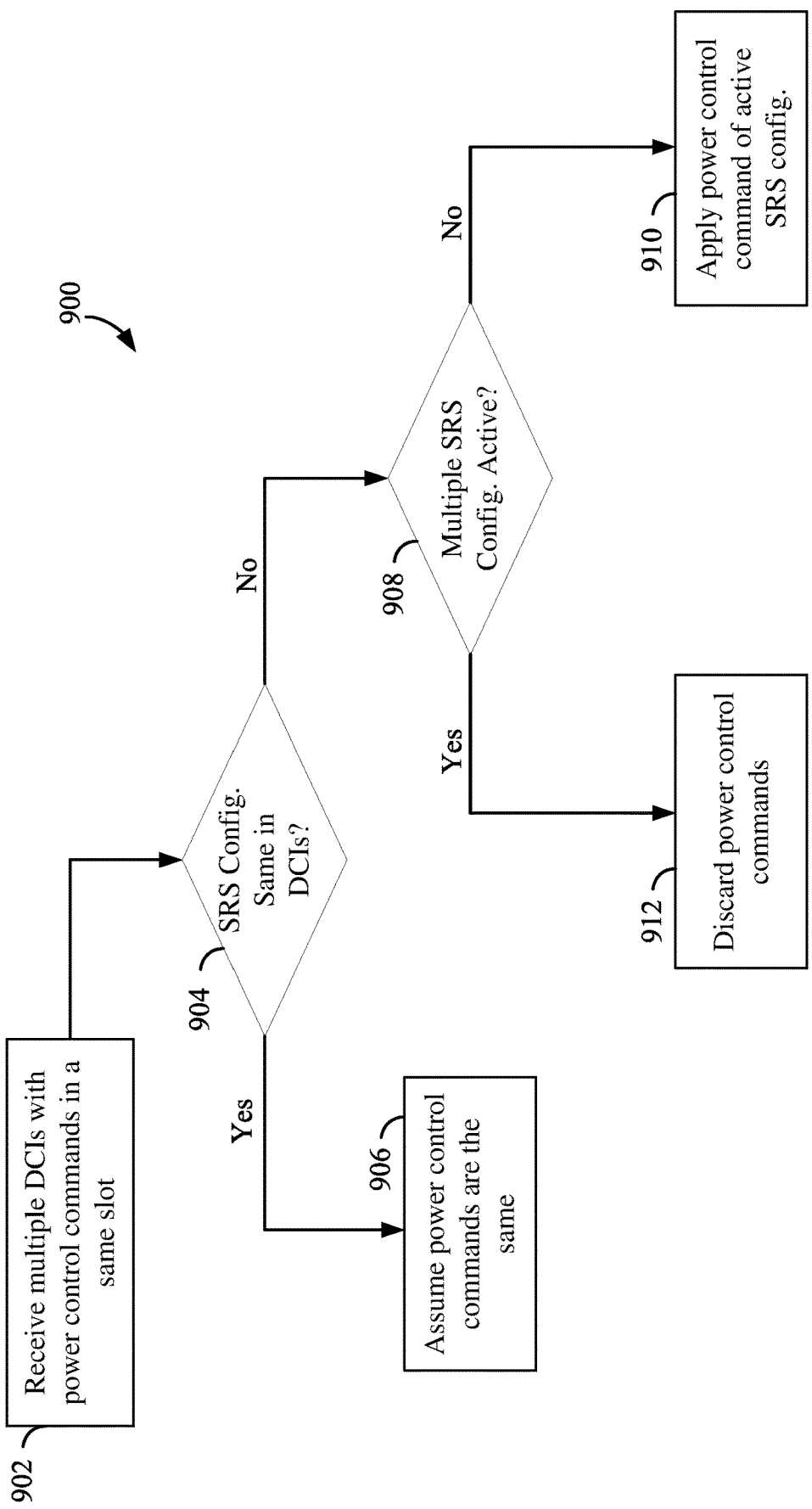
FIG. 9 is a diagram illustrating a process for handling multiple power control commands for a CC in a slot in accordance with another aspect of the disclosure.

FIG. 9 illustrates a process 900 for handling multiple power control commands for a same CC in the same slot according to some aspects of the disclosure. This process may be performed by the scheduled entity 204 or any wireless devices, for example, those illustrated in FIGS. 1, 2, 3, and/or 5. At block 902, the scheduled entity may receive multiple DCIs (e.g., DL DCIs and/or group DCIs) containing power control commands for the same CC in a same slot. At decision block 904, if the scheduled entity determines that the SRS configuration in both DCIs are the same for the same CC, the process proceeds to block 906; otherwise, it proceeds to decision block 908. The SRS configurations are considered to be the same if both SRS configurations trigger SRS transmission on the same CC. At block 906, the scheduled entity may assume that the power control commands received from different DCIs are supposed to be the same for the same CC. In one example, the scheduled entity may process the power control commands using the process 700 as described above in relation to FIG. 7. As another example, if the power control commands are indeed the same, the scheduled entity applies the same power control command to the CC triggered for SRS transmission. However, if this is not the case, the scheduled entity considers that as an error and discards the received power control commands.

At decision block 908, if the scheduled entity determines that only one of the SRS configurations in the DCIs is active, the scheduled entity applies the power control command of the active SRS at block 910. However, if the scheduled entity determines that multiple SRS configurations are active, the scheduled entity may discard all received power control commands at block 912. In one example, an SRS configuration is determined to be active if the corresponding SRS trigger bit in the DCI is activated (i.e., SRS transmission is triggered for the corresponding configuration).

Figure 10:
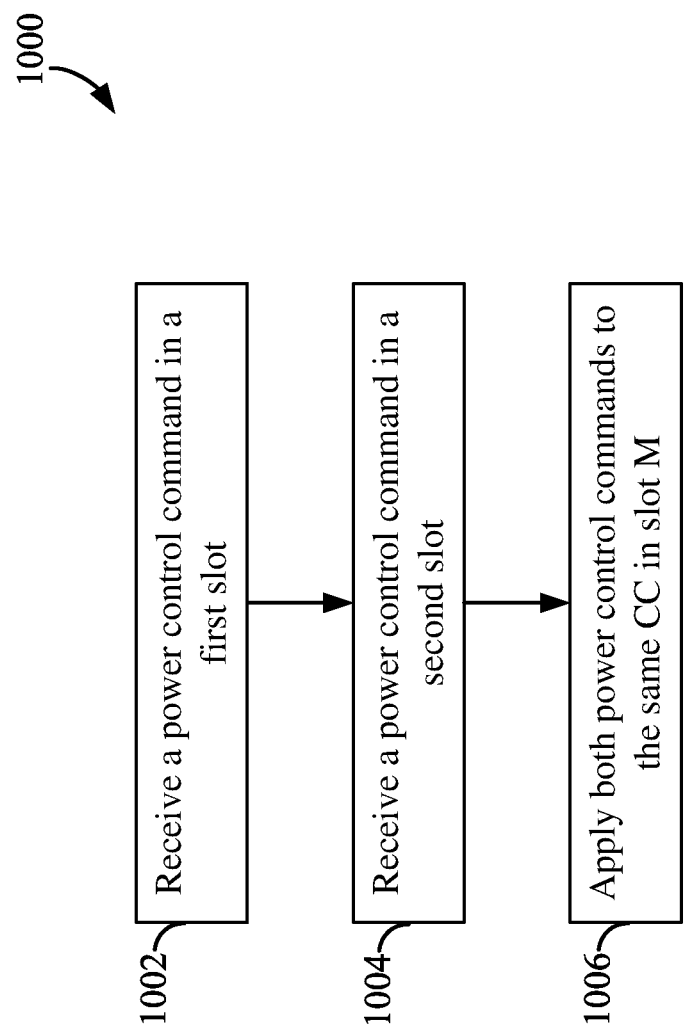
FIG. 10 is a diagram illustrating a process for handling multiple power control commands for a CC received in different slots in accordance with some aspects of the disclosure.

FIG. 10 is a diagram illustrating a process 1000 for handling multiple power control commands for a CC received in different slots in accordance with an aspect of the disclosure. This process may be performed by the scheduled entity 204 or any wireless devices, for example, illustrated in FIGS. 1, 2, 3, and/or 5. In some examples, the scheduled entity may receive multiple power control commands (e.g., DCIs) in different slots for the same CC.

At block 1002, the scheduled entity may receive a power control command for a CC in a first slot. At block 1004, the scheduled entity may receive another power control command for the same CC in a second slot after the first slot. The second slot may immediately follow the first slot, or may be separated from the first slot by other slot(s). For example, the first slot may be slot N, and the second slot may be slot N+1. In one example, the scheduled entity may receive in different slots a group DCI as well as a DL DCI or another group DCI, both DCIs triggering SRS transmission on the same CC but with different power control commands. The scheduled entity will make one SRS transmission based on the two DCIs. The scheduled entity may have different options for handling this situation.

At block 1006, the scheduled entity may apply both power control commands in a slot M after the first and second slots. In one example, the scheduled entity may transmit the SRS in a fifth slot after the first slot or any predetermined slot after the first slot. In one example, the scheduled entity may transmit an SRS on the CC with a power equal to the addition, sum, or combination of both power control commands.

Figure 11:
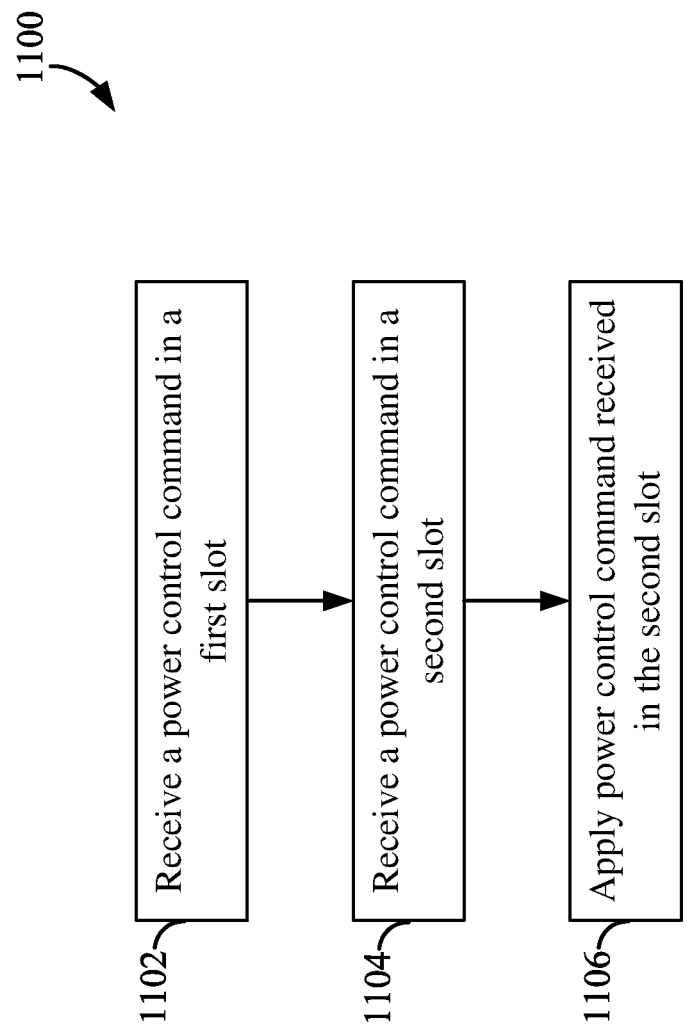
FIG. 11 is a diagram illustrating a process for handling multiple power control commands for a CC received in different slots in accordance with another aspect of the disclosure.

FIG. 11 is a diagram illustrating a process 1100 for handling multiple power control commands for a CC received in different slots in accordance with another aspect of the disclosure. This process may be performed by the scheduled entity 204 or any wireless devices, for example, illustrated in FIGS. 1, 2, 3, and/or 5. In some examples, the scheduled entity may receive multiple power control commands in different slots for the same CC.

At block 1102, the scheduled entity may receive a power control command for a CC in a first slot. At block 1104, the scheduled entity may receive another power control command for the same CC in a second slot after the first slot. The second slot may immediately follow the first slot, or may be separated from the first slot by one or more slot(s). For example, the scheduled entity may receive a power control command in slot N and another power control command in slot N+1. At block 1106, the scheduled entity may transmit the SRS on the CC with a power (e.g., transmit power) according to the last received (e.g., received in slot N+1) power control command.

With the above-described group RNTI approach, a group DCI may trigger SRS transmissions on multiple CCs. However, the scheduled entity may not have the resources (e.g., RF chain, antennas, power) to transmit SRSs on all triggered CCs simultaneously. Therefore, the scheduled entity may transmit the SRSs at different times (e.g., one SRS at a time). Aspects of the present disclosure provide various methods for determining the timing and/or order of multiple SRS transmissions on multiple CCs.

In one aspect of the disclosure, the SRS transmission order may be predetermined implicitly based on an order defined in the DCI or RRC configuration. In one example, if the DCI uses N fields to trigger SRS transmissions respectively on N CCs, the order of SRS transmissions on the CCs may be the same as the order of the N fields as defined in the DCI. For example, if the CCs configured for SRS transmissions are defined as CC0, CC1, CC2 in this order in the DCI, when the scheduled entity receives [1,0,1] as the SRS trigger flags, it transmits a first SRS on CC0, then a second SRS on CC2. No SRS is transmitted on CC1 because the corresponding trigger flag is set to 0 in this case.

In another example, if the DCI includes a single field (e.g., group SRS trigger field) to trigger a group of CCs for SRS transmissions, the scheduled entity may transmit the SRS on the CCs in the same order as the CCs are defined in their RRC configuration. For example, if an RRC configuration defines a group of CCs in the order of CC1, CC4, and CC3 for group SRS triggering, then the scheduled entity transmits the SRS in the order of CC1, CC4, and CC3 when triggered.

Some aspects of the present disclosure provide methods for handling conflict between multiple SRS transmissions when triggered. A scheduled entity may receive different DCIs that trigger conflicting SRS transmissions. For example, a scheduled entity may receive a first DCI that triggers SRS transmission on a certain CC. Before the scheduled entity has an opportunity to transmit the SRS on the triggered CC, it may receive another DCI that does not trigger SRS transmission on the same CC. In one aspect of the disclosure, the latest (last) received DCI overrides the previous one. In this case, the scheduled entity may discard the earlier pending SRS transmission corresponding to the earlier received DCI.

In another aspect of the disclosure, the scheduled entity may use some predetermined prioritization rules or priority order to deal with any collision or conflict between the SRS transmissions. The prioritization rules may consider, for example, CC index value, G-RNTI value, DCIs reception order, DL DCI taking precedence over group or G-RNTI trigger, etc.

Figure 12:
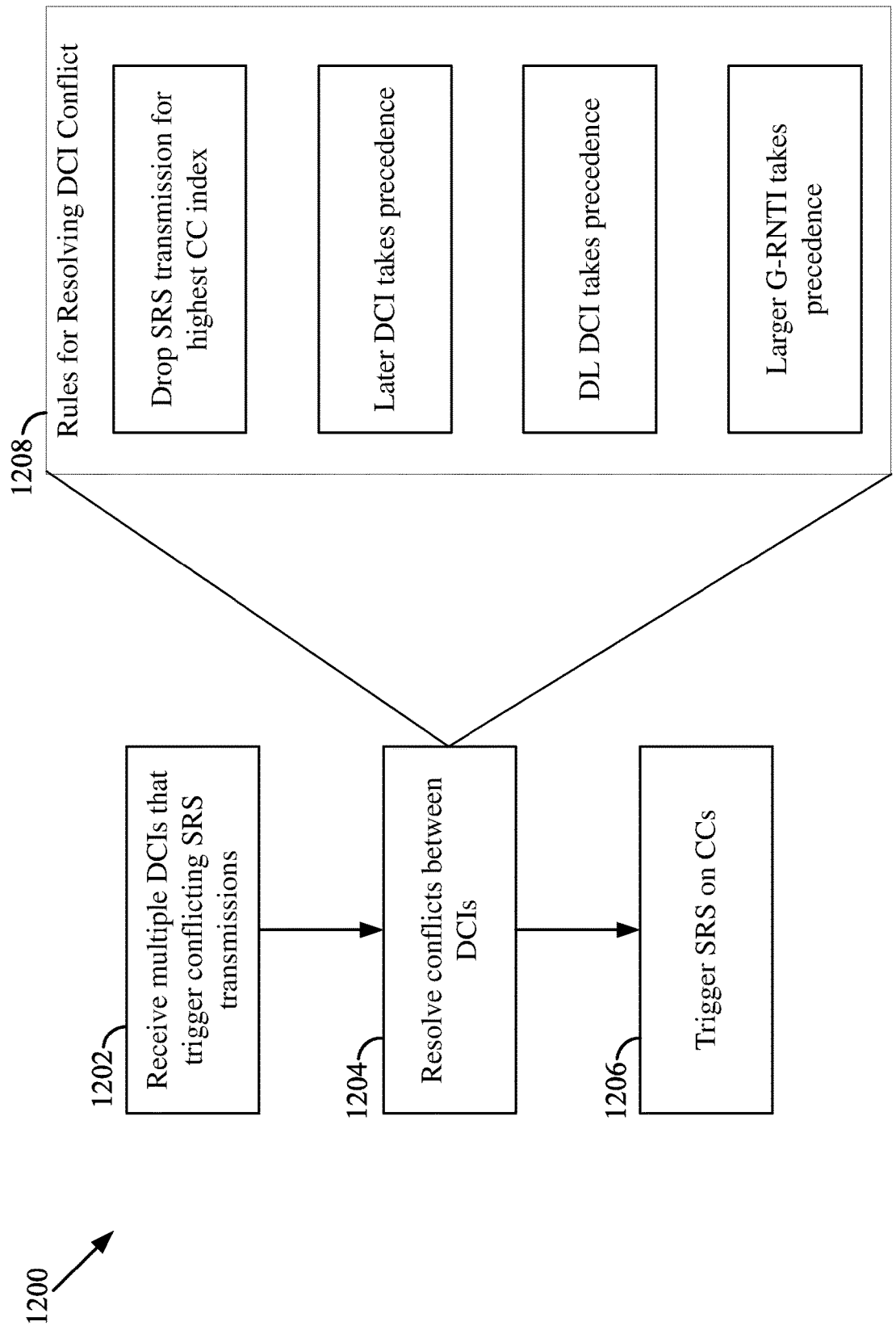
FIG. 12 is a diagram illustrating some exemplary rules for handling conflicts between multiple SRS triggers in accordance with some aspects of the disclosure.

FIG. 12 is a diagram illustrating a process 1200 for handling conflicts between multiple SRS triggers in accordance with an aspect of the disclosure. This process may be utilized by the scheduled entity 204 or any wireless devices, for example, illustrated in FIGS. 1, 2, 3, and/or 5.

At block 1202, the scheduled entity may receive multiple DCIs that trigger conflicting SRS transmissions on multiple CCs. The scheduled entity may receive the DCIs in the same slot or different slots. In either case, before the scheduled entity has an opportunity to transmit the triggered SRS of the first received DCI, it receives additional DCI(s) that may trigger conflicting SRS transmission(s). In one example, the scheduled entity may receive two DCIs that trigger SRS on different groups of CCs. The DCI may trigger SRS on CC1, CC3, and CC5, while the second DCI may trigger SRS on CC1, CC4, and CC5. In this case, there is a conflict between the groups, and the scheduled entity needs to decide whether to trigger SRS transmission on CC3 and/or CC4.

At block 1204, the scheduled entity may resolve the conflict between the DCIs based on one or more selected rules. After resolving the conflicts, at block 1206, the scheduled entity may transmit SRS on one or more CCs based on the resolution of the conflict.

Some examples of rules 1208 that may be utilized to resolve the conflict between the DCIs are described below. One or more of these rules may be used in any orders at block 1204.

In one example, the scheduled entity may drop the SRS transmission corresponding to the largest CC index. The CC index may be selected by the scheduling entity (e.g., an eNB, gNB) when configuring the scheduled entity (e.g., a UE) with carrier aggregation. For example, a CC index of 0 may be assigned to a primary CC (PCC), and CC indices greater than 0 may be assigned to secondary CCs (SCC). In another example, if the CC index is the same for conflicting SRS transmissions, the configuration that is received later in time takes precedence. For example, the first received DCI may trigger SRS on CC3, but the second (later) received DCI does not trigger CC3. In this case, the scheduled entity does not trigger SRS on CC3 (i.e., later DCI takes precedence).

In another example, if both DL DCI and group DCI are received with conflicting SRS control information, the DL DCI (e.g., UE-specific DCI) SRS triggers take precedence. In another example, if both DCIs are directed to group RNTIs, the DCI corresponding to a larger group RNTI takes precedence. A larger group RNTI may include a larger number of scheduled entities, UEs, or connections than a smaller group RNTI. The rules described above in relation to FIG. 12 may be implemented in whole or in part by any scheduled entity or apparatus.

In some examples, a scheduled entity may receive an SRS trigger corresponding to multiple SRS transmissions from a single DCI. The multiple SRS transmissions may be transmitted on multiple CCs, respectively. The scheduled entity may use a set of rules to determine the sequence or order of these multiple SRS transmissions (e.g., which CC may be transmitted first) and the resources (e.g., which slots/symbols) used to transmit the SRS.

Figure 13:
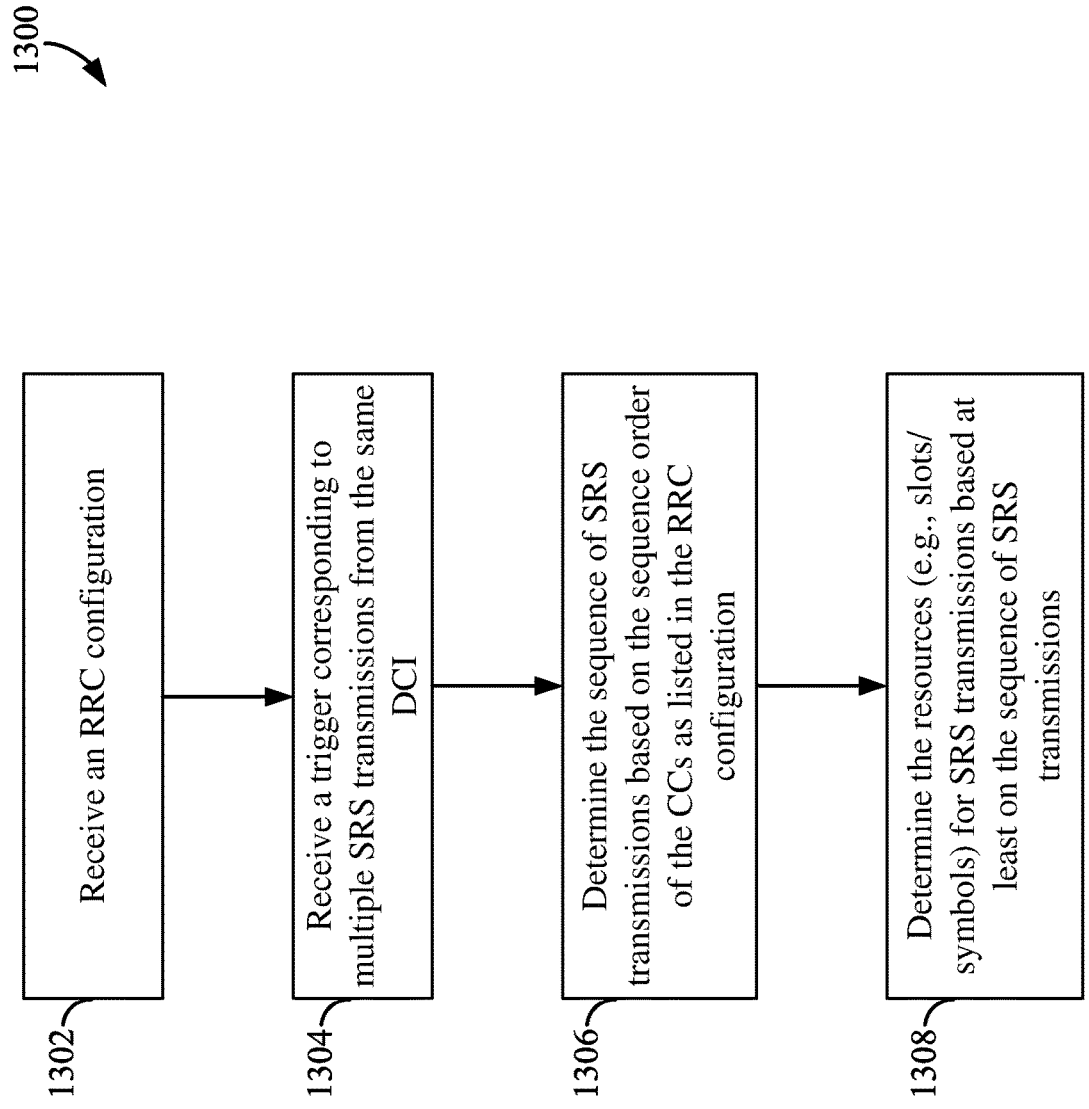
FIG. 13 is a diagram illustrating a process for handling multiple SRS triggers contained in a single DCI in accordance with an aspect of the disclosure.

FIG. 13 is a diagram illustrating a process 1300 for handling multiple SRS triggers contained in a single DCI in accordance with an aspect of the disclosure. This process may be utilized by the scheduled entity 204 or any wireless devices, for example, illustrated in FIGS. 1, 2, 3, and/or 5.

At block 1302, a scheduled entity may receive an RRC configuration that configures the scheduled entity to use CA that contains a list of CCs. As used herein, the CA containing multiple CCs as listed in an RRC configuration may be referred to as a "CA group". The RRC configuration may include multiple CA groups. At block 1304, the scheduled entity may receive an SRS trigger corresponding to multiple SRS transmissions from a single DCI (e.g., DL DCI or group DCI). In one example, the DCI may include a field that indicates which CA group is triggered. At block 1306, the scheduled entity may determine the sequence or order of SRS transmissions utilizing the CCs belonging to a CA group, based at least on the sequence order of the CCs as listed in the RRC configuration. For example, the CCs may be listed in the RRC configuration in the order of CC1, CC2, CC3, CC4, etc. Then if the DCI triggers SRS transmissions on CC1, CC3, and CC4, the scheduled entity may transmit SRS on CC1, CC3, and CC4 in that order.

With the above determination of the sequence of CCs for SRS transmissions, at block 1308, the scheduled entity may determine the resources (e.g., slots/symbols) for SRS transmissions based at least on the sequence of CCs utilized for SRS transmissions. In one example, the scheduled entity may first determine the resources for the first SRS transmission (i.e., the transmission corresponding to the first CC in the determined sequence of CCs). After the first SRS transmission is determined, the scheduled entity may determine the resources for the remaining SRS transmissions, for example, recursively. For example, the scheduled entity may determine the resources (e.g., slots/symbols) such that the resources used for transmitting the n-th SRS after or at the same time as the (n−1)-th SRS, do not collide or conflict with the resources for transmitting the 1, . . . , n−1 SRS transmissions (including retuning times).

Figure 14:
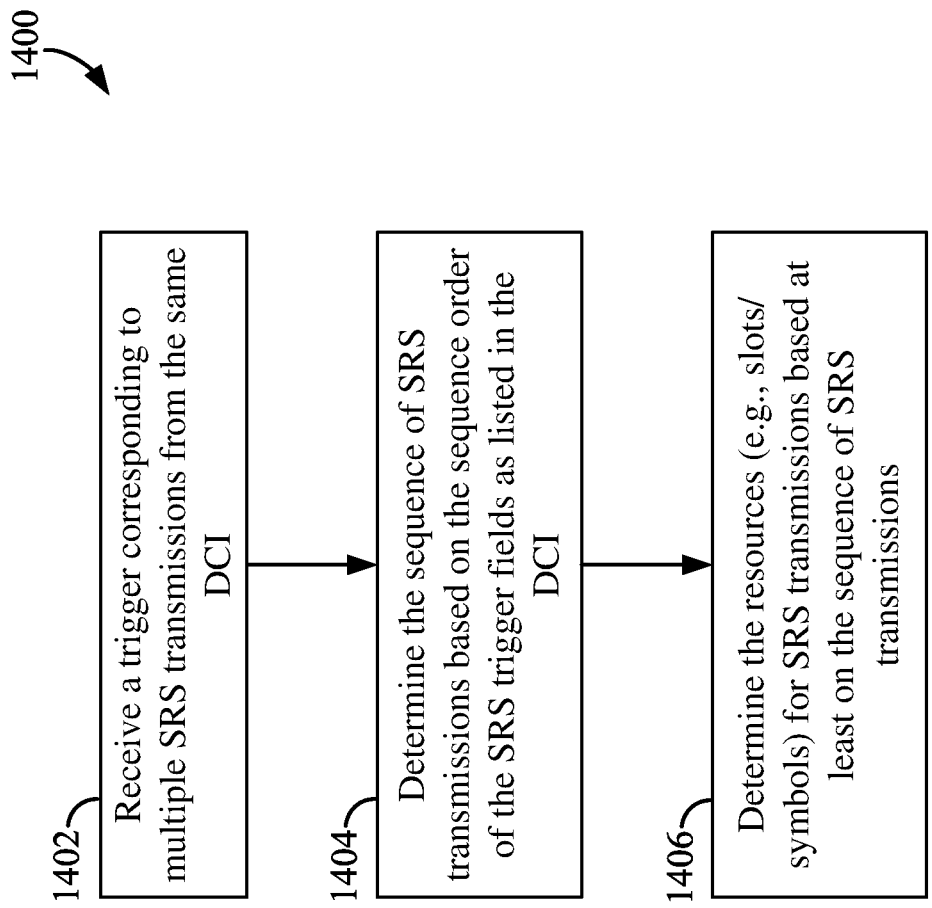
FIG. 14 is a diagram illustrating a process for handling multiple SRS triggers contained in a single DCI in accordance with another aspect of the disclosure.

FIG. 14 is a diagram illustrating another process 1400 for handling multiple SRS triggers contained in a single DCI in accordance with an aspect of the disclosure. This process may be utilized by the scheduled entity 204 or any wireless devices, for example, illustrated in FIGS. 1, 2, 3, and/or 5. This process 1400 is similar to the process 1300 described above in relation to FIG. 13. Therefore, redundant description may not be repeated. At block 1402, a scheduled entity may receive an SRS trigger corresponding to multiple SRS transmissions from a single DCI (e.g., DL DCI or group DCI). This DCI may contain a list of fields, each field triggering an SRS transmission on one CC. At block 1404, the scheduled entity may determine the sequence or order of SRS transmissions based at least on the order of the SRS trigger fields as listed in the DCI. With the above determination of the sequence of CCs for SRS transmissions, at block 1406, the scheduled entity may determine the resources (e.g., slots/symbols) for SRS transmissions based at least on the sequence of CCs utilized for SRS transmissions.

Figure 15:
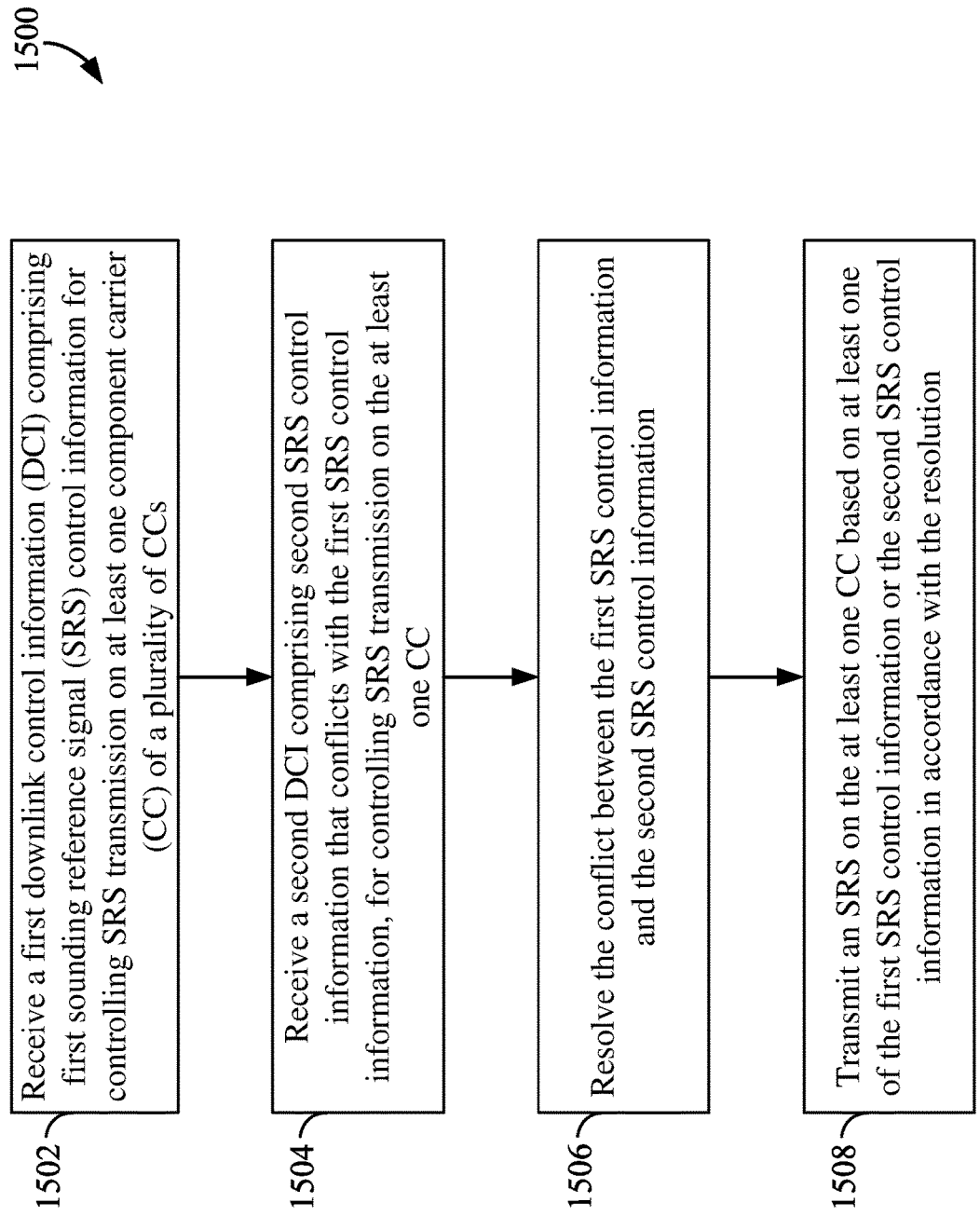
FIG. 15 is a flow chart illustrating an exemplary process for wireless communication using carrier aggregation in accordance with some aspects of the present disclosure.

FIG. 15 is a flow chart illustrating an exemplary process 1500 for wireless communication using carrier aggregation in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduled entity 300 illustrated in FIG. 3 or any apparatus illustrated in FIGS. 1, 2, and/or 5. In some examples, the process 1500 may be carried out by any suitable apparatus or means for carrying out the functions or algorithm described below.

At block 1502, the scheduled entity 300 (see FIG. 3) may utilize a transceiver 310 to receive a first DCI including first SRS control information for controlling SRS transmission on at least one component carrier (CC) of a plurality of CCs. For example, the first SRS control information may include SRS triggers for one or more CCs, and/or power control information for the triggered SRS on one or more CCs. In some examples, the first DCI may be a DL DCI or group DCI.

At block 1504, the scheduled entity 300 may receive a second DCI including second SRS control information for controlling SRS transmission on the at least one CC. For example, the second SRS control information may include SRS triggers for one or more CCs, and/or power control information for the triggered SRS on one or more CCs. The second SRS control information may conflict with the first SRS control information. For example, the first SRS control information may trigger SRS on a certain CC, while the second SRS control information may not trigger SRS on the same CC. In one example, the first SRS control information and second SRS control information may have conflicting power control information for the same CC or SRS transmission on the same CC.

At block 1506, the scheduled entity may utilize DCI conflict resolution circuitry 344 (see FIG. 3) to resolve the conflict between the first SRS control information and the second SRS control information. For example, the first SRS control information and second SRS control information may be in conflict in terms of, for example, SRS triggers and/or power control of the SRS transmission. For example, the scheduled entity may resolve the conflict according to one or more of the rules set forth in relation to FIGS. 6-14.

At block 1508, the scheduled entity may utilize an SRS control circuitry 346 and transceiver 310 to transmit one or more SRSs on the at least one CC based on at least one of the first SRS control information or the second SRS control information in accordance with the resolution. For example, the SRS control circuitry 346 may determine the SRS, if any, to be transmitted on one or more CCs based on the resolution determined by the DCI conflict resolution circuitry 344.

Figure 16:
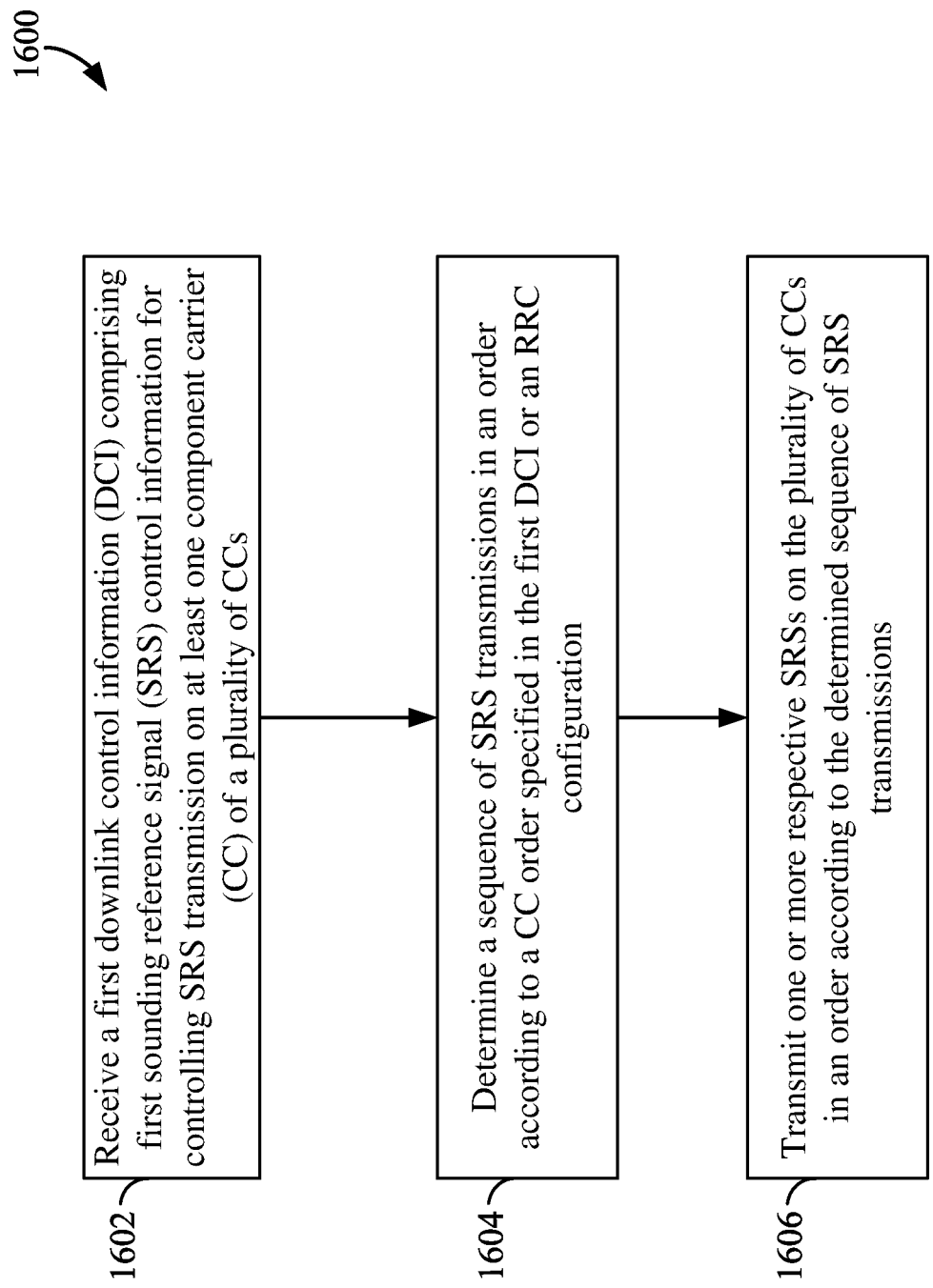
FIG. 16 is a flow chart illustrating another exemplary process for wireless communication using carrier aggregation in accordance with some aspects of the present disclosure.

FIG. 16 is a flow chart illustrating an exemplary process 1600 for wireless communication using carrier aggregation in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduled entity 300 illustrated in FIG. 3 or any apparatus illustrated in FIGS. 1, 2, and/or 5. In some examples, the process 1600 may be carried out by any suitable apparatus or means for carrying out the functions or algorithm described below.

At block 1602, the scheduled entity 300 (see FIG. 3) may utilize a transceiver 310 to receive a first DCI including first SRS control information for controlling SRS transmission on at least one component carrier (CC) of a plurality of CCs. For example, the first SRS control information may include SRS triggers for one or more CCs, and/or power control information for the triggered SRS on one or more CCs. In some examples, the first DCI may be a DL DCI or group DCI.

At block 1604, the scheduled entity 300 may utilize DCI conflict resolution circuitry 344 (see FIG. 3) to determine a sequence of SRS transmissions in an order according to a CC order specified in the first DCI or an RRC configuration. For example, the scheduled entity 300 may determine the sequence according to the methods described in relation to FIGS. 13 and 14. At block 1606, the scheduled entity may utilize an SRS control circuitry 346 and transceiver 310 to transmit one or more respective SRSs on the plurality of CCs in an order according to the determined sequence of SRS transmissions.

In various aspects of the disclosure, the processes and procedures described above in relation to FIGS. 6-16 may be rearranged and combined in various different ways including some or all of the described processes and procedures.

In one configuration, the apparatus 300 for wireless communication includes means for performing the functions described in relation to FIGS. 5-16. In one aspect, the aforementioned means may be the processor(s) 304 in which the invention resides from FIG. 3 configured to perform the functions recited by the aforementioned means. In another aspect, the aforementioned means may be a circuit or any apparatus configured to perform the functions recited by the aforementioned means.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described in any one of the FIGS. 1,2, and/or 5, and utilizing, for example, the processes and/or algorithms described herein in relation to FIGS. 5-16.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as 5G New Radio (NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more."

Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication comprising:
   a communication interface;
   a memory comprising executable code; and
   a processor operatively coupled to the communication interface and the memory,
   wherein the processor is configured by the executable code to:
   receive a first downlink control information (DCI) comprising first sounding reference signal (SRS) control information for controlling SRS transmission on at least one component carrier (CC) of a plurality of component carriers (CCs);
   determine a sequence of SRS transmissions based on the SRS control information in an order according to a component carrier order specified in the first DCI or a radio resource control (RRC) configuration; and
   initiate transmission, via the communication interface, of one or more respective SRSs on the at least one CC in the order according to the determined sequence of SRS transmissions.

2. The apparatus of claim 1, wherein the order of the sequence of SRS transmissions is the same as an order of a plurality of fields defined in the first DCI to trigger SRS transmissions.

3. The apparatus of claim 1, wherein the order of the sequence of SRS transmissions is the same as an order of the plurality of CCs defined in the RRC configuration.

4. The apparatus of claim 1, wherein the processor is further configured by the executable code to:
   receive a second DCI comprising second SRS control information that is in conflict with the first SRS control information, for controlling SRS transmission on the at least one CC;
   determine a resolution for the conflict between the first SRS control information and the second SRS control information for the least one CC; and
   initiate transmission, via the communication interface, of one or more SRSs on the at least one CC in accordance with the resolution.

5. The apparatus of claim 4, wherein the processor is further configured by the executable code to:
   if the second DCI is received later in time than the first DCI, override the second SRS control information with the first SRS control information; and
   if the first DCI is received later in time than the second DCI, override the first SRS control information with the second SRS control information.

6. The apparatus of claim 4, wherein the processor is further configured by the executable code to determine the resolution by considering at least one of:
CC index values;
relative receiving time of the first DCI and the second DCI;
a DCI type;
a group Radio Network Temporary Identifier (RNTI) size; or
combinations thereof.

7. The apparatus of claim 4, wherein the conflict comprises at least one of:
different or conflicting SRS triggering information directed to a same CC of the plurality of CCs; or
different or conflicting power control commands directed to a same CC of the plurality of CCs.

8. A method for wireless communication using carrier aggregation comprising:
receiving a first downlink control information (DCI) comprising first sounding reference signal (SRS) control information for controlling SRS transmission on at least one component carrier (CC) of a plurality of component carriers (CCs);
determining a sequence of SRS transmissions based on the SRS control information in an order according to a component carrier order specified in the first DCI or a radio resource control (RRC) configuration; and
transmitting one or more respective SRSs on the at least one CC in the order according to the determined sequence of SRS transmissions.

9. The method of claim 8, wherein the order of the sequence of SRS transmissions is the same as an order of a plurality of fields defined in the first DCI to trigger SRS transmissions.

10. The method of claim 8, wherein the order of the sequence of SRS transmissions is the same as an order of the plurality of CCs defined in the RRC configuration.

11. The method of claim 8, further comprising:
receiving a second DCI comprising second SRS control information that is in conflict with the first SRS control information, for controlling SRS transmission on the at least one CC;
determining a resolution for the conflict between the first SRS control information and the second SRS control information for the least one CC; and
transmitting one or more SRSs on the at least one CC in accordance with the resolution.

12. The method of claim 11, further comprising:
if the second DCI is received later in time than the first DCI, overriding the second SRS control information with the first SRS control information; and
if the first DCI is received later in time than the second DCI, overriding the first SRS control information with the second SRS control information.

13. The method of claim 11, wherein the determining the resolution comprises considering at least one of:
CC index values;
relative receiving time of the first DCI and the second DCI;
a DCI type;
a group Radio Network Temporary Identifier (RNTI) size; or
combinations thereof.

14. The method of claim 11, wherein the conflict comprises at least one of:
different or conflicting SRS triggering information directed to a same CC of the plurality of CCs; or
different or conflicting power control commands directed to a same CC of the plurality of CCs.

15. A non-transitory computer-readable storage medium comprising code for causing a wireless communication device using carrier aggregation to:
receive a first downlink control information (DCI) comprising first sounding reference signal (SRS) control information for controlling SRS transmission on at least one component carrier (CC) of a plurality of component carriers (CCs);
determine a sequence of SRS transmissions based on the SRS control information in an order according to a component carrier order specified in the first DCI or a radio resource control (RRC) configuration; and
transmit one or more respective SRSs on the at least one CC in the order according to the determined sequence of SRS transmissions.

16. The non-transitory computer-readable storage medium of claim 15, wherein the order of the sequence of SRS transmissions is:
the same as an order of a plurality of fields defined in the first DCI to trigger SRS transmissions; or
the same as an order of the plurality of CCs defined in the RRC configuration.

17. The non-transitory computer-readable storage medium of claim 15, wherein the code further causes the wireless communication device to:
receive a second DCI comprising second SRS control information that is in conflict with the first SRS control information, for controlling SRS transmission on the at least one CC;
determine a resolution for the conflict between the first SRS control information and the second SRS control information for the least one CC; and
transmit one or more SRSs on the at least one CC in accordance with the resolution.

18. The non-transitory computer-readable storage medium of claim 17, wherein the code further causes the wireless communication device to:
if the second DCI is received later in time than the first DCI, override the second SRS control information with the first SRS control information; and
if the first DCI is received later in time than the second DCI, override the first SRS control information with the second SRS control information.

19. The non-transitory computer-readable storage medium of claim 17, wherein the code further causes the wireless communication device to determine the resolution by considering at least one of:
CC index values;
relative receiving time of the first DCI and the second DCI;
a DCI type;
a group Radio Network Temporary Identifier (RNTI) size; or
combinations thereof.

20. The non-transitory computer-readable storage medium of claim 17, wherein the conflict comprises at least one of:
different or conflicting SRS triggering information directed to a same CC of the plurality of CCs; or
different or conflicting power control commands directed to a same CC of the plurality of CCs.

* * * * *